Patented Jan. 2, 1940

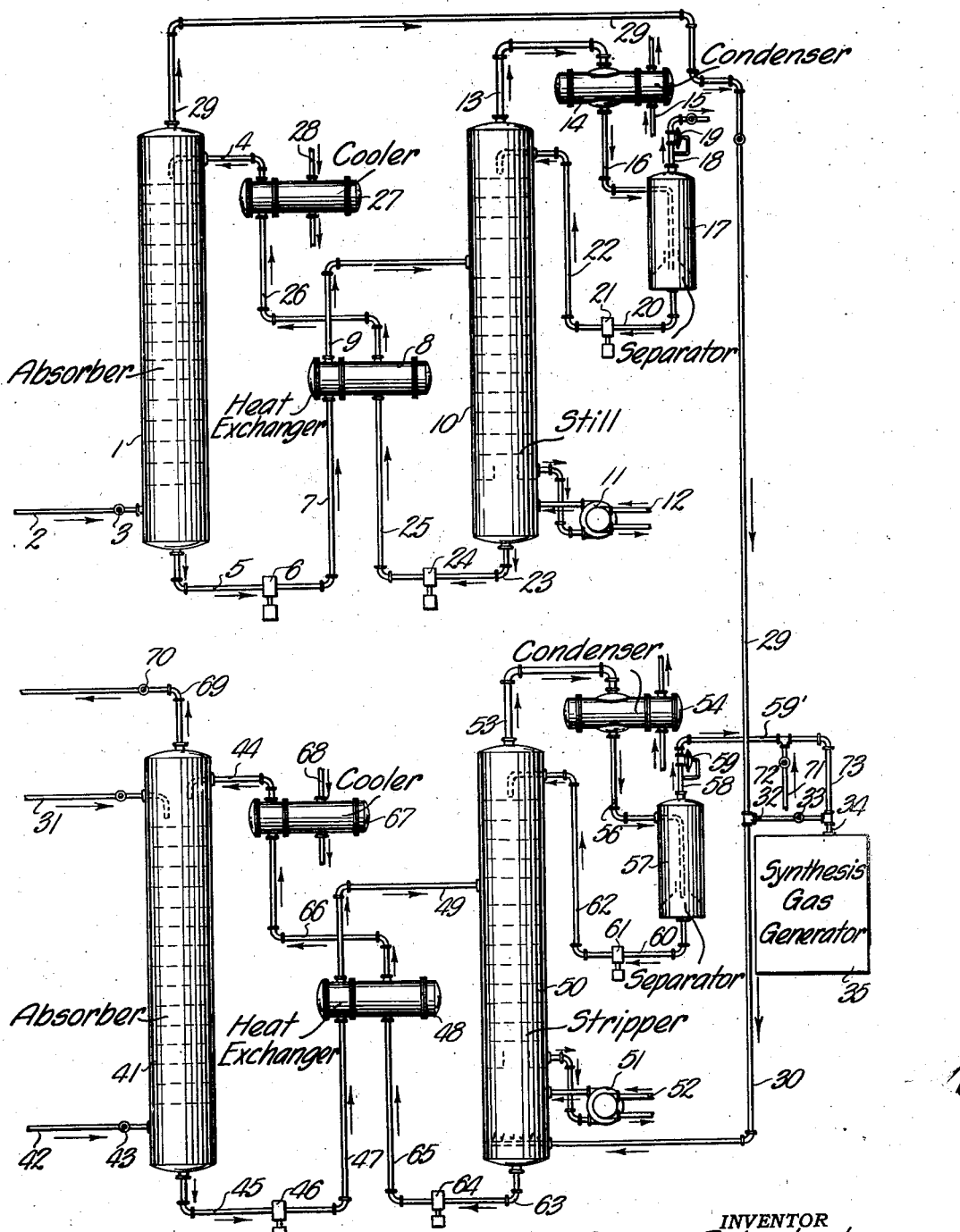

2,185,989

UNITED STATES PATENT OFFICE 2,185,989

METHOD OF PREPARING MIXTURES OF CARBON MONOXIDE AND HYDROGEN

George Roberts, Jr., Montclair, N. J., assignor to The M. W. Kellogg Company, New York, N. Y., a corporation of Delaware Application August 19, 1938, Serial No. 225,755

6 Claims. (Cl. 23—212)

My invention relates to a method of preparing raw material gases in predetermined proportions for the production of a mixture of carbon monoxide and hydrogen, or more particularly, synthesis gas for use in various catalytic synthesis processes.

It is well known that synthesis gas (mixtures of carbon monoxide and hydrogen) may be formed from methane, carbon dioxide and steam, at temperatures between 1800° F. and 2200° F. in the presence of a catalyst.

Methane will combine with carbon dioxide and steam as follows:

$$3CH_4 + CO_2 + 2H_2O = 4CO + 8H_2$$

The above method being known, does not of itself comprise my invention, which resides in the novel combination which will be hereinafter more fully pointed out.

It has been suggested that carbon dioxide may be recovered from flue gas or previously reacted synthesis gas, or any gas rich in carbon dioxide, such as fermentation gas, or the like. The carbon dioxide containing gas is introduced into an absorption tower where it is contacted with monoethanolamine, diethanolamine, or other menstruum which has an affinity for carbon dioxide. In the case of flue gas as a source of carbon dioxide, the unabsorbed gas usually contains nitrogen, which passes off from the top of the absorption tower. The carbon dioxide absorbed in the menstruum is passed to a stripper and stripped of its carbon dioxide by means of steam. The use of steam makes the process of recovery of carbon dioxide very expensive in some cases, and the result is that in many cases the recovery of carbon dioxide from flue gases or the like might be uneconomical.

One object of my invention is to provide an economical method of generating synthesis gas.

A further object of my invention is to provide a method of generating synthesis gas in which the methane used in whole or in part for the synthesis gas generation is employed as a stripping medium to strip absorbed carbon dioxide from the liquid menstruum.

Other and further objects of my invention will appear from the following description.

The accompanying drawing, which forms part of the instant specification and which is to be read in conjunction therewith, is a diagrammatic view of one form of apparatus capable of carrying out the method of my invention.

More particularly, referring now to the drawings, methane or natural gas from any suitable source is introduced into absorber 1 through pipe 2, controlled by valve 3. A sulfur absorbing menstruum, such as triethanolamine, is introduced into the absorber tower 1 through pipe 4, flows downwardly in contact with the rising methane. Hydrogen sulfide and other sulphur compounds are absorbed by the menstruum and are withdrawn from the absorber 1 through pipe 5, and pumped by pump 6 through pipe 7 through heat exchanger 8, through pipe 9, and introduced into a still 10. The menstruum is reboiled by reboiler 11 through heat from steam introduced to the reboiler through pipe 12. Hydrogen sulfide and light sulfur bearing compounds are distilled from the menstruum and pass overhead through pipe 13 through condenser 14, which is furnished a cooling medium through pipe 15. The condensate and uncondensed hydrogen sulfide are withdrawn from the condenser through pipe 16 and passed to a separator 17, from which the hydrogen sulfide is withdrawn through pipe 18, controlled by back pressure controlled valve 19. Any of the menstruum which has been vaporized is recovered as a condensate and withdrawn from the separator through pipe 20 and pumped by pump 21 through pipe 22 to the top of the still as a top tower temperature control reflux. The denuded menstruum is withdrawn from the bottom of the still through pipe 23 and pumped by pump 24 through pipe 25, through heat exchanger 8, through pipe 26, through cooler 27, and thence through pipe 4 for introduction into the absorber. The cooler is supplied a cooling medium through pipe 28. The methane or natural gas denuded of sulfur compounds is withdrawn from the absorber through pipe 29, and is led by pipe 30 to the bottom of stripping tower 50. A portion of the methane may pass through pipe 32, controlled by valve 33, into pipe 34, which passes to the synthesis gas generating zone, indicated diagrammatically by the reference numeral 35.

Any suitable carbon dioxide bearing gas, such as flue gas, waste gas from the synthesizing step in which the synthesis gas is used, fermentation gases, or the like, is introduced into the absorber 41 through pipe 42, controlled by valve 43. A menstruum having an affinity for carbon dioxide, such as monoethanolamine, diethanolamine, and the like, is introduced into the absorber through pipe 44. The menstruum with absorbed carbon dioxide is withdrawn from the bottom of the absorber through pipe 45 and pumped by pump 46 through pipe 47, through heat exchanger 48, through pipe 49, for introduction into the stripping tower 50.

The temperature at the bottom of the stripper is maintained at a predetermined point by means of reboiler 51, to which steam is supplied through pipe 52. Methane being introduced into the stripper through pipe 30 strips the carbon dioxide from the absorbed menstruum. Due to the stripping effect of methane, very little steam need be used through pipe 52. Furthermore, with the use of methane the temperature at the top of the stripper may be maintained at such a point that water vapor will leave the top of the stripper tower through pipe 53 along with the stripped carbon dioxide and methane. This allows a greater temperature difference to be employed in the top reflux condenser 54, and thereby reduces the surface required. The water balance must be made in the $CO_2$ recovery system. If more water is leaving as vapor than enters as vapor, make-up water may be added at any suitable place as, for example, through pipe 31 into the absorber. The condensate, uncondensed gases or vapors, and incondensable gases, such as carbon dioxide and methane, leave the condenser through pipe 56 and pass into a separator 57, from which methane, carbon dioxide and a portion of water vapor are withdrawn through pipe 58, controlled by back pressure controlled valve 59.

Any of the absorption menstruum which passes overhead as vapor, and a certain proportion of water will form the condensate which is removed from the separator 57 through pipe 60 and pumped by pump 61 through pipe 62 into the stripper 50. The denuded menstruum is removed from the stripper through pipe 63 and pumped by pump 64 through pipe 65, through heat exchanger 48 through pipe 66, through cooler 67, through pipe 44, for introduction into the absorber tower. Cooling medium is supplied the cooler 67 through pipe 68. The waste gases denuded of carbon dioxide are removed from the absorber through pipe 69, controlled by valve 70. The gases withdrawn from the separator 57 through pipe 59' will contain carbon dioxide (recovered), methane (the stripping medium), and a small portion of water vapor.

The desired proportion of water in the mixture going to the synthesis gas generator 35 is controlled by introducing steam through pipe 71, controlled by valve 72. The mixture of carbon dioxide, methane and steam then passes through pipe 73 into pipe 34, whence it flows to the synthesis gas generator 35. The correct ratio of methane is maintained by adding additional methane through pipe 32, controlled by valve 33.

It will be seen that I have accomplished the objects of my invention. I have provided a convenient and expeditious method of forming synthesis gas in which carbon dioxide is recovered by an absorption menstruum and stripped by a light desulfurized gas such as methane, which is itself used in forming the synthesis gas so that no separation need be made between the stripping gas and the stripped gas. The practice enables the saving of process steam, which in many cases is expensive to employ. I need use only such steam as to bring the solution to equilibrium temperature under the reduced partial pressure created by my use of methane as a stripping medium. By my method the temperature of the top of the reactivator or stripper 50 may be such that some water vapor may also leave with the methane and carbon dioxide. This enables the employment of a greater temperature difference on the top reflux cooler, thereby reducing the surface required. The water vapor, it will be noted, forms a portion of the reacting gases which pass to the synthesis gas generator.

The method described is of particular utility in those cases where the carbon dioxide absorbent has a very low vapor pressure. On the other hand, when an absorbent having a high vapor pressure is used, a part of it would be vaporized by the methane and would be carried thereby to the synthesis gas production step.

While the production of a mixture of methane, carbon dioxide and steam is particularly adapted for the manufacture of carbon monoxide and hydrogen to be used in synthesis, the mixture may also be used for other purposes than the production of synthesis gas. In other words, the combination of methane, carbon dioxide and steam mixed in the manner set forth may be used in the production of chemicals, or for innumerable purposes besides synthesis, and the invention contemplates such uses, as well as the synthesis gas production described.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of preparing a mixture of carbon monoxide and hydrogen for catalytic synthesis including the steps of desulfurizing methane to remove objectionable sulfur compounds, subjecting a carbon dioxide-bearing gas to absorption by an absorption menstruum selective to carbon dioxide in an absorption zone, stripping the absorbed carbon dioxide from the absorption menstruum by means of the methane removed from the desulfurizing zone and thereby forming a mixture of carbon dioxide and methane, generating the desired synthesis gas comprising carbon monoxide and hydrogen by heating said mixture of carbon dioxide and methane in a synthesis gas generating zone at temperatures above 1500° F. in the presence of a catalyst.

2. A method as in claim 1 in which steam is added to the mixture of carbon dioxide and methane before its passage to the synthesis gas generating zone.

3. A method of preparing a mixture of carbon monoxide and hydrogen for catalytic synthesis including the steps of subjecting a carbon dioxide-bearing gas to absorption by an absorption menstruum selective to carbon dioxide in an absorption zone to form an enriched menstruum, stripping the carbon dioxide from the enriched menstruum by means of methane, passing the stripped carbon dioxide and methane to a synthesis gas generating zone and there subjecting them to a temperature above 1500° F. in the presence of a cataylst.

4. A method of preparing a mixture of carbon monoxide and hydrogen for catalytic synthesis including the steps of subjecting a carbon dioxide bearing gas to absorption by an absorption menstruum selective to carbon dioxide in an absorption zone to form an enriched menstruum, stripping the carbon dioxide from the enriched menstruum by means of methane, passing the stripped carbon dioxide and methane to a synthesis gas generating zone and there subjecting them to a temperature above 1500° F. in the presence of a catalyst and steam.

5. A method of preparing a mixture of carbon monoxide and hydrogen for catalytic synthesis including the steps of subjecting a carbon dioxide bearing gas to absorption by an absorption menstruum selective to carbon dioxide in an absorption zone to form an enriched menstruum, stripping the carbon dioxide from the enriched menstruum by means of methane, controlling the temperature in the stripping stage to avoid loss of the absorbing menstruum through vaporization, passing the stripped carbon dioxide and methane to a synthesis gas generating zone and there subjecting them to a temperature above 1500° F. in the presence of a catalyst.

6. A method as in claim 5 wherein the carbon dioxide stripping step is carried on in the presence of introduced water and the temperature in said stripping step is maintained at a point to permit the vaporization of water.

GEORGE ROBERTS, Jr.